(12) United States Patent
Sotokawa

(10) Patent No.: US 6,570,666 B1
(45) Date of Patent: May 27, 2003

(54) PRINTER DETECTING DATA PRECISELY IN RESPONSE TO CHANGE IN DATA TRANSMISSION SPEED

(75) Inventor: Hiroshi Sotokawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/014,161

(22) Filed: Jan. 27, 1998

(30) Foreign Application Priority Data

| Jan. 27, 1997 | (JP) | 9-012914 |
| Jan. 27, 1997 | (JP) | 9-012915 |
| Jan. 27, 1997 | (JP) | 9-012916 |

(51) Int. Cl.[7] .............................................. G06K 15/00
(52) U.S. Cl. ..................................... 358/1.15; 709/229
(58) Field of Search ............................... 395/114, 115; 358/1.13, 1.14, 1.1, 1.2, 1.3, 1.4, 1.5, 1.6, 1.7, 1.8, 1.9, 1.11, 1.12, 1.17, 1.18

(56) References Cited

U.S. PATENT DOCUMENTS

| 3,914,573 | A | * | 10/1975 | Perrault et al. | 358/435 |
| 4,827,341 | A | * | 5/1989 | Akimoto et al. | 348/526 |
| 5,123,757 | A | * | 6/1992 | Nagaoka et al. | 395/114 |
| 5,128,677 | A | * | 7/1992 | Donovan et al. | 341/177 |
| 5,542,071 | A | | 7/1996 | Maupin et al. | 703/25 |
| 5,577,044 | A | * | 11/1996 | Oxford | 370/522 |
| 5,793,993 | A | * | 8/1998 | Broedner et al. | 709/234 |
| 5,881,240 | A | * | 3/1999 | Asano | 709/233 |
| 5,905,759 | A | * | 5/1999 | Ishida et al. | 375/282 |

FOREIGN PATENT DOCUMENTS

| EP | 596752 | 5/1994 |
| JP | A-9-319201 | 12/1997 |

* cited by examiner

Primary Examiner—Gabriel Garcia
Assistant Examiner—King T. Poon
(74) Attorney, Agent, or Firm—Sughrue Mion, PLLC (57) ABSTRACT

A printer, which is connected to a host computer, comprises a synchronizing signal output section for outputting a synchronizing signal to the host computer, a data detection section for detecting print data received from the host computer by using a sampling signal, and a print processing execution section for performing print processing based on the detected print data, wherein the sampling signal has a frequency higher than the synchronizing signal has. Upon detection of a change command for changing the clock rate of the synchronizing signal from the host computer, the printer may give a signal to the host computer for instructing the host computer to stop transmitting data and change the synchronizing signal into the clock rate specified in the change command. Upon completion of changing the clock rate of the synchronizing signal, the printer may output a signal to the host computer for instructing the host computer to restart transmitting data. A count value is counted by a timer in sequence and each time the expiration of the counting is reached, a data output command signal may be output to a data transmission section and data of a predetermined length may be transmitted from the data transmission section to the host computer.

21 Claims, 10 Drawing Sheets

PRINTER DETECTING DATA PRECISELY IN RESPONSE TO CHANGE IN DATA TRANSMISSION SPEED

BACKGROUND OF THE INVENTION

The present invention relates to a printer for executing print processing according to print data input from a host computer such as a personal computer and in particular to a printer to which print data is input from the host computer in synchronization with a synchronizing signal output from the printer to the host computer.

Some printers for executing print processing based on print data transmitted from a host computer adopt a two-way synchronous serial interface system wherein the printer supplies a synchronizing signal to the host computer and receives print data synchronized with the synchronizing signal from the host computer. The printer adopting such an interface system receives print data transmitted by a host computer at the same timing as a synchronizing signal supplied to the host computer, thereby performing print processing.

A first conventional printer adopting such an interface system samples print data transmitted by a host computer at the same timing as a synchronizing signal supplied to the host computer, thereby detecting print data. Specifically, the printer samples and detects a start bit placed at the top of data on the rising or falling edge of a synchronizing signal, thereby determining print data.

However, the first conventional printer cannot correctly detect print data if the channel between the printer and the host computer, for example, the length of a printer cable changes or the transmission speed becomes higher than the initial speed. Therefore, the first conventional printer may become unable to execute required print processing. That is, a delay on a channel such as the printer cable between the printer and the host computer or a transmission circuit of the host computer may cause the rising or falling timing of a synchronizing signal when the printer samples print data to differ from the rising or falling timing of a print data signal from the host computer. If the data transmission speed becomes high and the synchronizing signal frequency also becomes high, effect of the difference on the synchronizing signal width becomes larger relatively, thus the printer cannot detect a start bit in the print data.

A second conventional printer is a printer in a system wherein a host computer is connected to another computer and peripheral machines, for example, by a LAN (local area network). In the system, when the host computer outputs print data to the printer, it may change the data transmission speed to the printer because the host computer needs to perform any other processing at the same time.

In such a case, normally the host computer sends a change command for changing the clock rate of a synchronizing signal to the printer as data and the printer receiving the command changes the synchronizing signal to the corresponding clock rate.

However, generally the second conventional printer is adapted to once store the data transmitted from the host computer in a reception buffer memory and read the stored data in sequence for processing. Thus, if a data transmission speed change command as described above is transmitted, the change command is processed after the previously stored data is processed. Meanwhile, the host computer needs to stop transmitting data and stand by for a given time after transmitting the change command.

That is, a temporary wait occurs in the host computer because the host computer cannot send subsequent data until it becomes possible for the printer to receive data at new setup data transmission speed or until reception of a speed change complete notification from the printer. In this case, the host computer needs to be provided with a protocol for performing wait processing and the printer needs to be provided with a protocol for returning a speed change complete notification.

If the host computer is adapted to send data after the change command, the printer needs to be provided with a circuit capable of reliably receiving data after the data transmission speed is changed and the host computer needs also to be provided with a circuit capable of reliably transmitting data in such a case.

A third conventional printer is a printer for transmitting a status signal of a notifying a current state of the printer, such as printing, print completion, or no paper, to a host computer as required. In this case, the host computer notifies the host computer user of the current state of the printer. To communicate data between the printer and the host computer based on a synchronizing signal transmitted from the printer to the host computer as described above, a kind of the status signal is transmitted from the printer to the host computer in synchronization with the synchronizing signal.

Here, for example, if the host computer has a low data reception capability, namely, has a small input buffer or a low reception data processing capability, there is a fear of occurrence of incomplete or missing data in the host computer. In such a case, the third conventional printer adopts a technique of setting the transmission speed of data transferred between the host computer and the printer to low speed to such a degree that the host computer can process data.

The host computer transmits a data transmission speed change command to the printer, requesting the printer to lower the data transmission speed of the synchronizing signal output from the printer to such a degree that the host computer can process data, thereby temporarily changing the data transmission speed of the synchronizing signal output from the printer. In this case, the host computer receives a synchronizing signal at new setup data transmission speed from the printer, prepares for data reception at the speed, and upon completion of the preparation, transmits a completion signal (for example, Ready signal) to the printer, then receives data from the printer. After receiving the data from the printer, the host computer performs similar processing to change the data transmission speed to the former speed.

To perform data transmission speed change processing as described above, the host computer is provided with a protocol for performing such control and sends a predetermined command to the printer based on the protocol and a protocol corresponding thereto is also set in the printer.

However, in the third conventional printer, if the data transmission speed between the host computer and the printer is set low, as the data transmission speed from the host computer to the printer lowers, the time required for transmitting print data from the host computer is prolonged and it takes time until completion of print processing. To temporarily change the data transmission speed, the third conventional printer needs to perform complicated processing as described above; control becomes complicated and it takes extra time to execute processing.

SUMMARY OF THE INVENTION

It is therefore an object of the present invention to provide a printer that can correctly detect print data from a host computer even if data transmission speed becomes high or a channel becomes long.

It is another object of the present invention to provide a printer that can change data transmission speed easily.

It is still another object of the present invention to provide a printer that can reliably transmit necessary data to the host computer even if the host computer has a low data processing capability.

Other objects of the present invention will appear more fully from the following description.

According to one aspect of the present invention, there is provided a printer for transmitting a synchronizing signal to a host computer, using a sampling signal to detect print data from data transmitted from the host computer in synchronization with the synchronizing signal, and performing print processing based on the detected print data, characterized in that the sampling signal has a frequency higher than the synchronizing signal has.

According to another aspect of the present invention, there is provided a printer comprising an interface control section for communicating data between a host computer, a print processing execution section for performing print processing based on data received from the host computer through the interface control section, a synchronizing signal output section being placed in the interface control section for outputting a synchronizing signal to the host computer, a data reception section being placed in the interface control section for receiving data transmitted from the host computer at data transmission speed based on the synchronizing signal, a command detection section for detecting a change command for changing the clock rate of the synchronizing signal in the data received at the data reception section, and a control section being placed in the interface control section, when the command detection section detects the change command, the control section for giving a signal to the host computer for instructing the host computer to stop transmitting data and controlling the synchronizing signal output section so as to change the synchronizing signal to the clock rate specified in the change command, upon completion of changing the clock rate of the synchronizing signal, the control section for outputting a signal to the host computer for instructing the host computer to restart transmitting data.

According to still another aspect of the present invention, there is provided a printer comprising: an interface control section for communicating data between a host computer; a print processing execution section for performing print processing based on data received from the host computer via the interface control section; a timer section for counting a setup count value in sequence, a control section for outputting a data output command signal each time the expiration of the counting in the count section is reached; and a data transmission section for transmitting data of a predetermined length to the host computer upon reception of the data output command signal from the control section.

DESCRIPTION OF THE PREFERRED EMBODIMENTS

Referring now to the accompanying drawings, there are shown preferred embodiments of the present invention.

Figure 1:
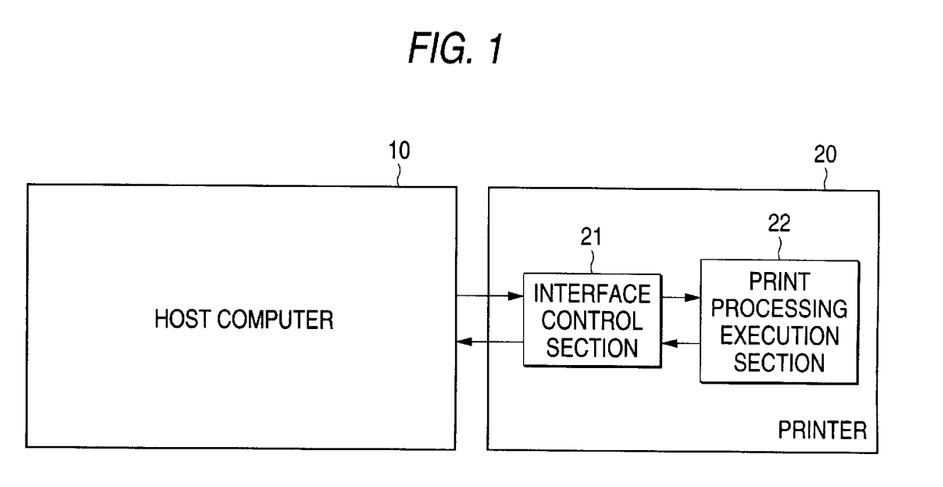
FIG. 1 is a block diagram to show a printer according to a first embodiment of the present invention.

FIG. 1 is a block diagram to show a printer according to a first embodiment of the present invention. As shown in FIG. 1, the printer 20 is connected to a host computer 10 such as a personal computer by a printer cable (not shown), etc. The printer 20 is made up of an interface control section (I/F) 21 for communicating data between the host computer 10 and a print processing execution section 22 connected to the interface control section 21.

Figure 2:
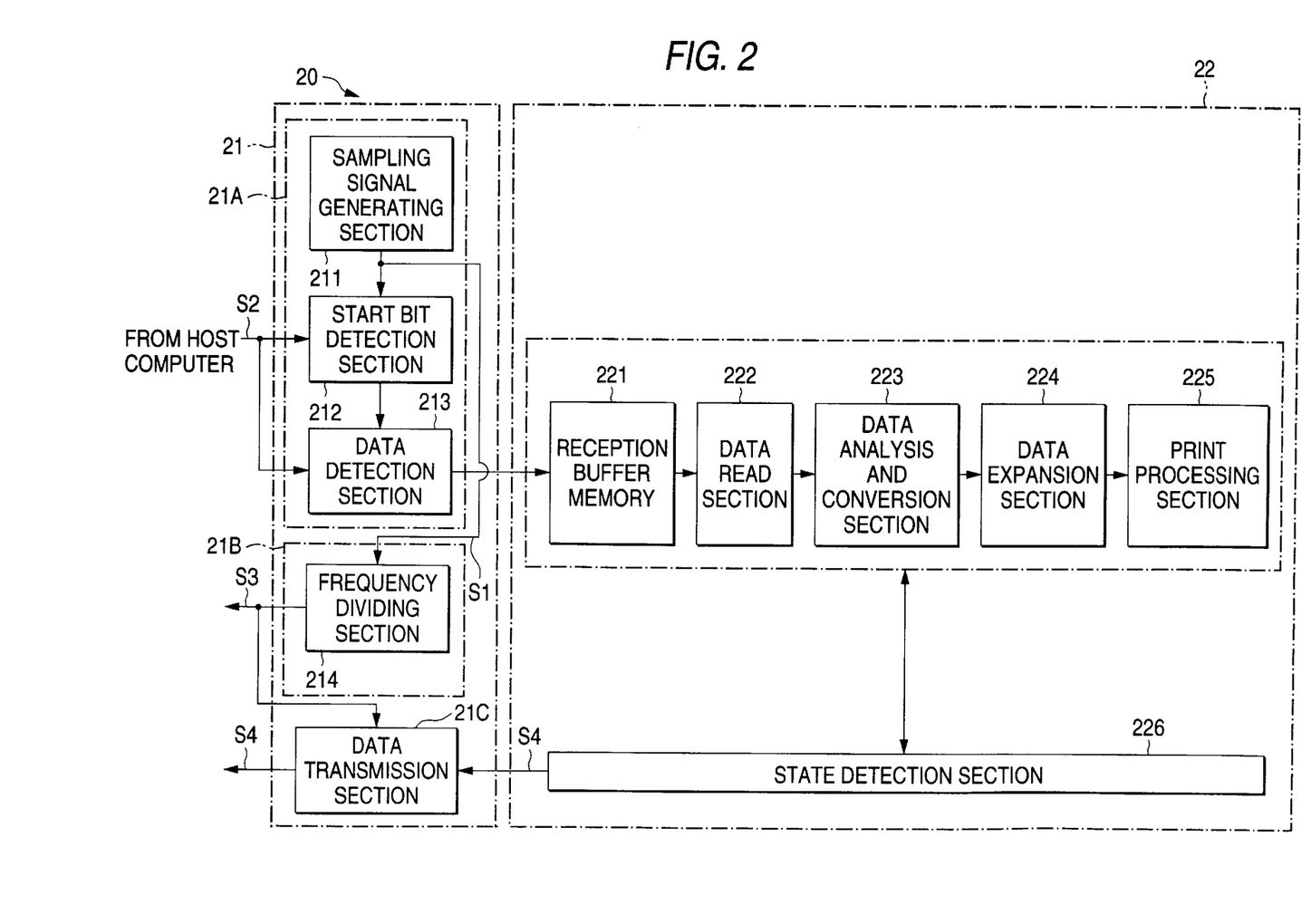
FIG. 2 is a block diagram to show the internal configuration of the printer in FIG. 1.

As shown in FIG. 2, the interface control section 21 comprises a data reception section 21A for receiving data S2 from the host computer 10, a synchronizing signal output section 21B for outputting a synchronizing signal S3, and a data transmission section 21C for outputting a status signal S4. The data S2 from the host computer 10 contains print data, a control command, etc. The data reception section 21A is made up of a sampling signal generation section 211, a start bit detection section 212, and a data detection section 213. The synchronizing signal output section 21B consists essentially of a frequency dividing section 214. The start bit detection section 212 and the data detection section 213 make up a print data detection section (not shown).

The sampling signal generation section 211 generates a sampling signal S1 for sampling print data from data transmitted from the host computer 10 at a predetermined frequency. The start bit detection section 212 samples print data from the data S2 transmitted from the host computer 10 at the timing at which the sampling signal S1 rises or falls, and detects a start bit placed at the top of the print data. The data detection section 213 detects a data part of the data S2 following the start bit and transmits the detected data part to the print processing execution section 22. The frequency dividing section 214 divides the sampling signal S1 from the sampling signal generation section 211 and transmits the divided signal to the host computer 10 as the synchronizing signal S3.

The print processing execution section 22 is made up of a reception buffer memory section 221, a data read section 222, a data analysis and conversion section 223, a data expansion section 224, a print processing section 225, a state detection section 226, etc.

The reception buffer memory section 221 temporarily stores data input via the data detection section 213 of the interface control section 21. The data read section 222 reads the data stored in the reception buffer memory section 221 in sequence. The data analysis and conversion section 223 analyzes the data read by the data read section 222 and converts the data into a predetermined data format. The data expansion section 224 expands the data provided by the data analysis and conversion section 223 into print image data.

The print processing section 225 performs print processing based on the print image data provided by the data expansion section 224. The state detection section 226 outputs the status signal S4 indicating the current state of the printer 20, such as printing, print completion, or no paper. The status signal S4 is output from the data transmission section 21C of the interface control section 21 to the host computer 10 in synchronization with the synchronizing signal S3 at a predetermined timing. In addition to the status signal S4, for example, a code signal for indicating the model of the printer 20 is transmitted from the printer 20 to the host computer 10.

The operation of the sections of the printer 20 is normally controlled by a central processing unit (CPU) installed in the printer 20 for performing required processing in accordance with instructions (a computer program and necessary data) stored in an instruction storage unit such as a ROM installed in the printer 20.

Next, an example of the operation of the printer 20 will be discussed with reference to FIG. 3, which shows the timings of the sampling signal S1 generated in the printer 20, the synchronizing signal S3 transmitted from the printer 20 to the host computer 10, the data S2 input to the printer 20, and the like.

The data S2 begins with a start bit part B1, followed by a data part B2, followed by a parity bit part B3 for the data part B2, followed by a stop bit part B4. This format of the data S2 is basically the same as that adopted by a UART (universal asynchronous receiver transmitter) of a known controller. For example, the start bit part B1 and the parity bit part B3 each consists of one bit, the data part B2 consists of eight bits, and the stop bit part B4 consists of two bits.

With the printer 20 and the host computer 10 connected by a printer cable, the synchronizing signal S3 is output from the interface control section 21 of the printer 20 to the host computer 10. As the host computer 10 receives the synchronizing signal S3, it generates data S2 synchronized with the synchronizing signal S3 and transmits the data S2 to the printer 20 via the printer cable, etc.

The data S2 is synchronized with the synchronizing signal S3 output from the printer 20. Therefore, the start bit B1 of the data S2 arrives at the printer 20 at the timing delayed as much as the going and returning channels between the printer 20 and the host computer 10 and the channel in the transmission circuit of the host computer 10. The start bit detection section 212 detects the start bit B1 of the received data S2 at the timing at which the sampling signal S1 rises, for example, and sends the detection result to the data detection section 213. Upon reception of the detection result from the start bit detection section 212, the data detection section 213 outputs the data part B2 of the data S2 following the start bit B1 to the reception buffer memory section 221 of the print processing execution section 22. The print processing execution section 22 executes necessary print processing based on the data part B2.

Figure 3:
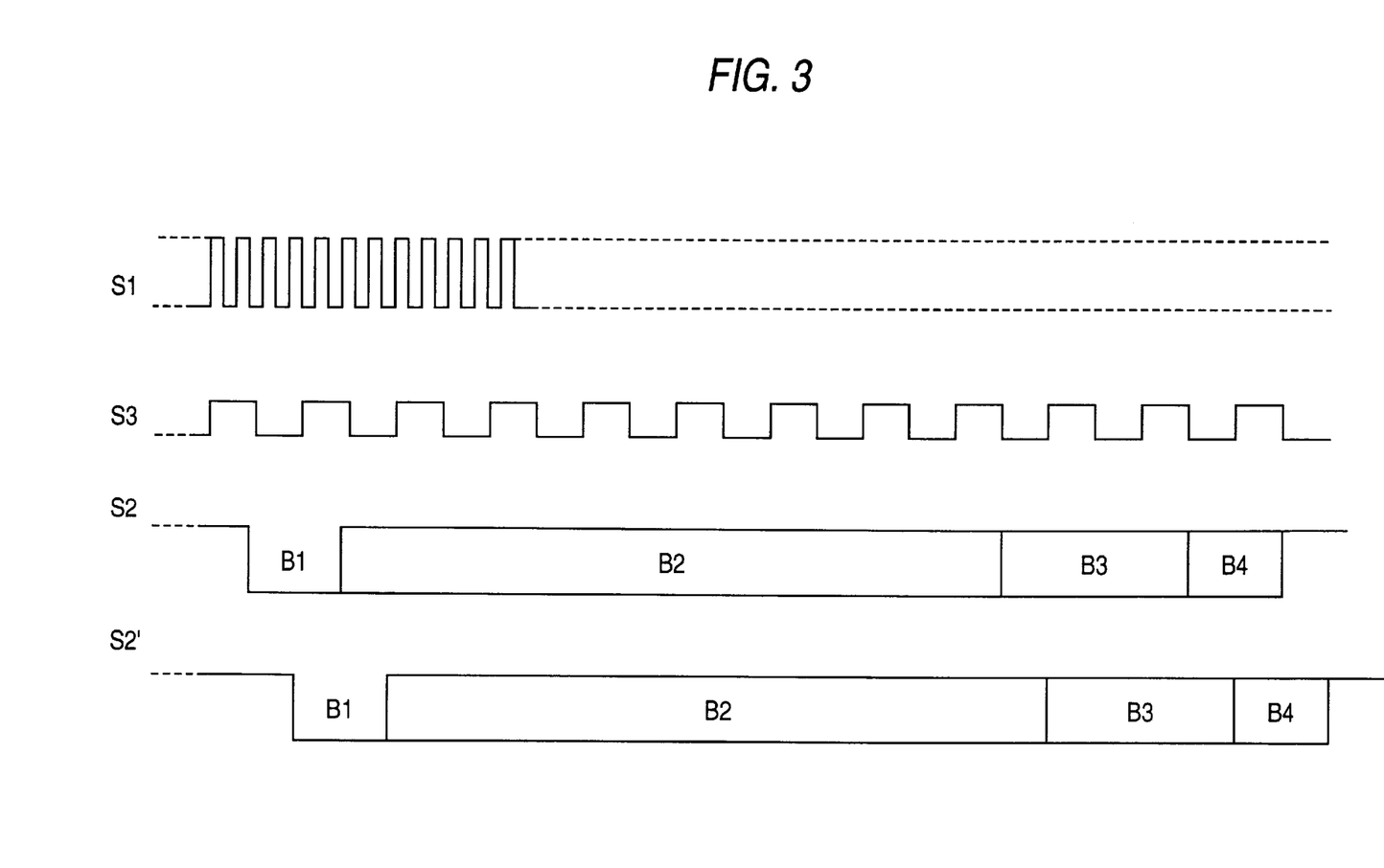
FIG. 3 is a timing chart to explain the operation of the printer in FIG. 1.

In FIG. 3, data S2' means an example wherein a long printer cable is placed between the printer 20 and the host computer 10. In this case, the start bit B1, etc., of the data S2' is furthermore delayed as compared with the data S2.

In the first embodiment, the sampling signal is divided to generate the synchronizing signal. However, the present invention is not limited to it. That is, the printer of the present invention may have a device for generating a synchronizing signal apart from a sampling signal. In the printer of the present invention, the frequency of the sampling signal must have be set higher than that of the synchronizing signal. If the frequency of the sampling signal is set to about 4 to 16 times as high as the frequency of the synchronizing signal, a sufficient effect is produced on practical use, but the present invention is not necessarily limited to it. Further, the frequency of the sampling signal may be set apart from the frequency of the synchronizing signal. In this case, the flexibility of the frequency of the synchronizing signal is increased and the synchronizing signal can be changed as desired in response to the specifications of the printer.

As seen from the description made so far, the printer according to the first embodiment of the present invention detects the print data from the host computer by the sampling signal having a higher frequency than the frequency of the synchronizing signal. Therefore, even if the data transmission speed becomes high or the channel becomes long, the printer according to the first embodiment of the present invention can detect the print data reliably. In other words, the printer allows the channel to be made long and the data transmission speed to be made high so long as the waveform becomes dull, thus the printer can be used in a wide range of application.

Figure 4:
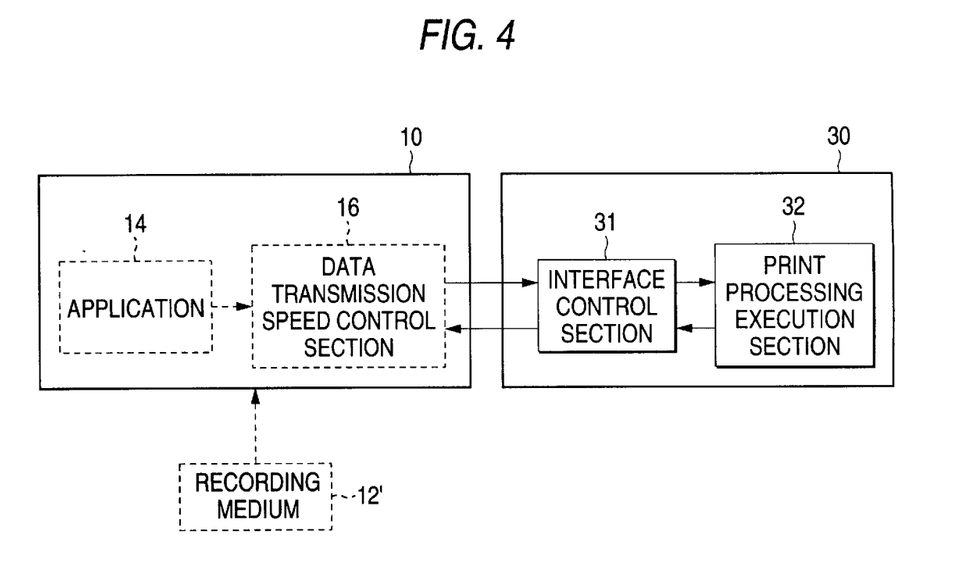
FIG. 4 is a block diagram to show a printer according to a second embodiment of the present invention.

Next, a second embodiment of the present invention will be discussed with reference to FIGS. 4 to 6. Parts identical with those previously described with reference to the first embodiment are denoted by the same reference numerals. As shown in FIG. 4, a printer 30 according to the second embodiment of the present invention is connected to a host computer 10 by a printer cable (not shown), whereby the printer 30 and the host computer 10 make up a print system. The printer 30 is made up of an interface control section 31 connected to the host computer 10 and a print processing execution section 32 connected to the interface control section 31.

Figure 5:
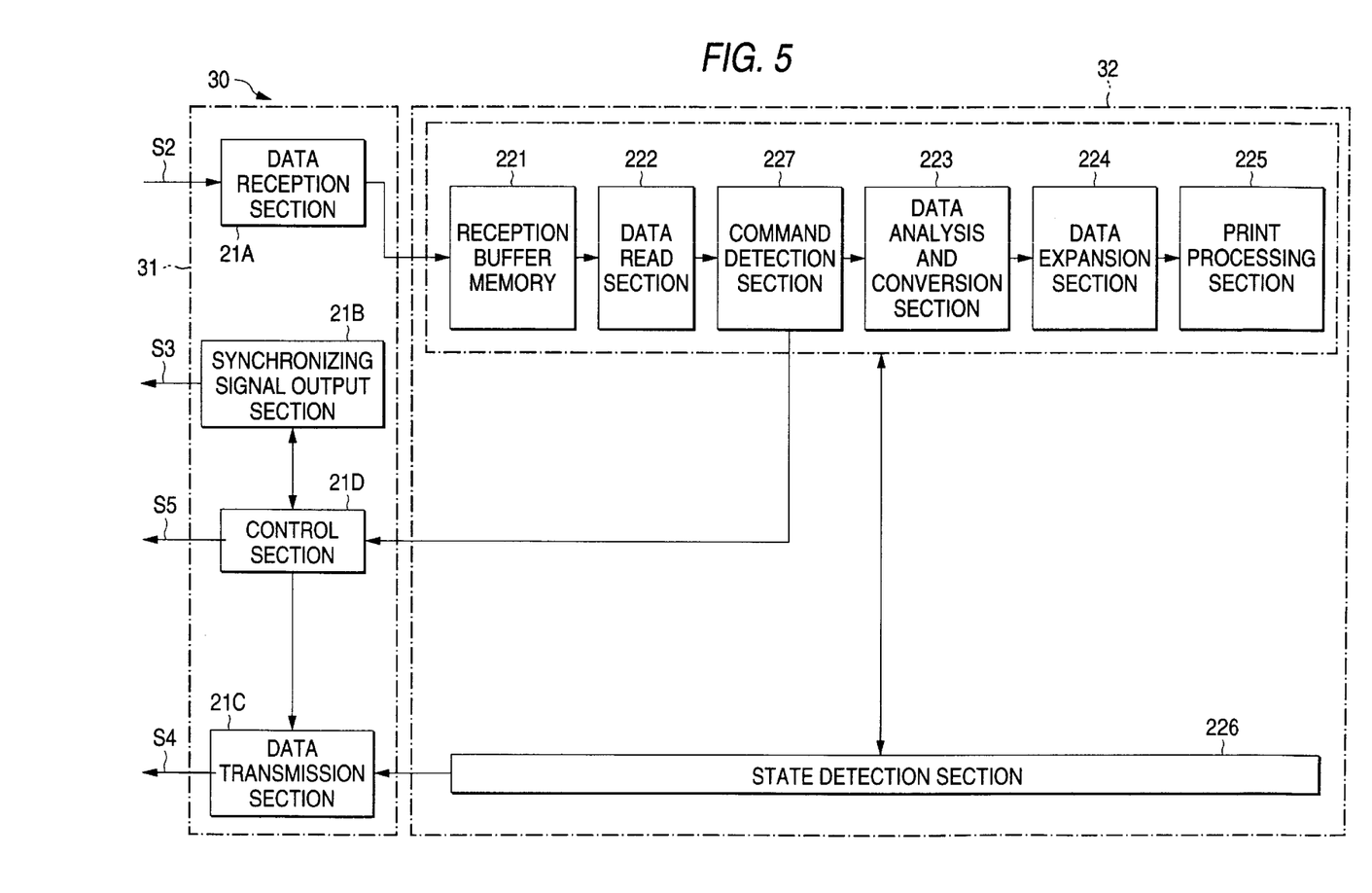
FIG. 5 is a block diagram to show the internal configuration of the printer in FIG. 4.
Figure 6:
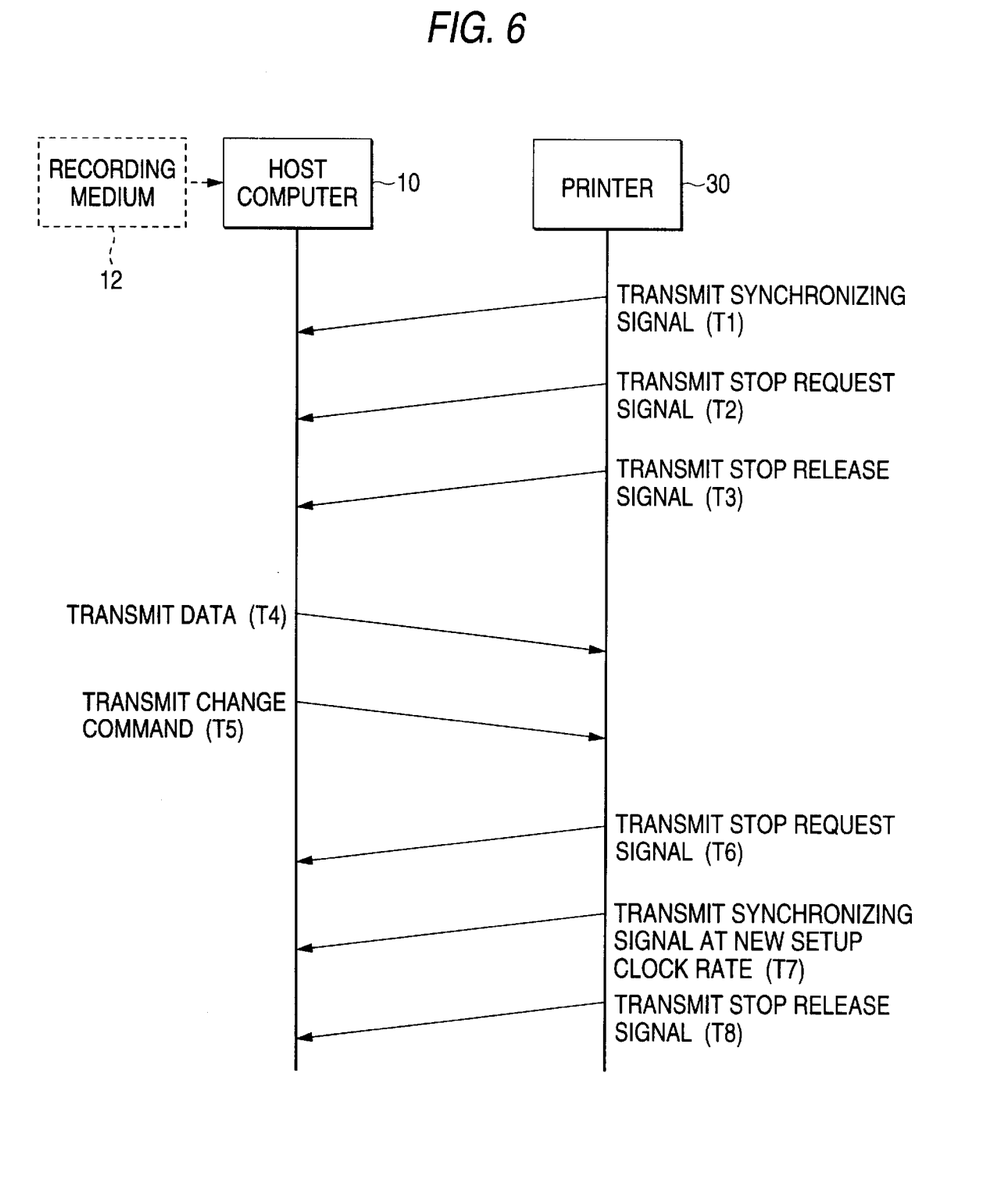
FIG. 6 is a sequence chart to explain the operation of the printer in FIG. 4.

As shown in FIG. 5, the interface control section 31 comprises a data reception section 21A, a synchronizing signal output section 21B, a data transmission section 21C, and a control section 21D. The data reception section 21A receives data S2 transmitted from the host computer 10 and transmits the data containing print data, control commands, etc., to the print processing execution section 32. The synchronizing signal output section 21B outputs a synchronizing signal S3 to the host computer 10. If the control section 21D receives a change command for changing the clock rate of the synchronizing signal from the print processing execution section 32, it gives a clock rate change signal to the synchronizing signal output section 21B, requesting the synchronizing signal output section 21B to change the clock rate of the synchronizing signal to the clock rate as specified in the change command. When receiving the clock rate change signal from the control section 21D, the synchronizing signal output section 21B changes the synchronizing signal S3 to the clock rate corresponding to the clock rate change signal.

The print processing execution section 32 has a reception buffer memory section 221, a data read section 222, a command detection section 227, a data analysis and conversion section 223, a data expansion section 224, a print processing section 225, and a state detection section 226.

The reception buffer memory section 221 temporarily stores data input via the data reception section 21A of the interface control section 31. The data read section 222 reads the data stored in the reception buffer memory section 221 in sequence. When the command detection section 227 detects the change command in the data read by the data read section 222, it sends the change command to the control section 21D. The data analysis and conversion section 223 analyzes print data in the data read by the data read section 222 and converts the print data into a predetermined data format. The data expansion section 224 expands the data provided by the data analysis and conversion section 223 into print image data. The print processing section 225 performs print processing based on the print image data provided by the data expansion section 224.

As in the first embodiment, the operation of the sections of the printer 30 is controlled by a central processing unit (CPU) for performing required processing in accordance with instructions (a computer program and necessary data) stored in an instruction storage unit such as a ROM installed in the printer 30.

Next, the operation of the printer 30 according to the second embodiment of the present invention will be discussed with reference to FIG. 6, which is a sequence chart to show a data transfer sequence between the host computer 10 and the printer 30. In the description to follow, T1–T8 denote processing steps.

The host computer 10 and the printer 30 are connected by a printer cable, etc., for making up a print system. In this state, first a synchronizing signal S3 is output at a default clock rate from the synchronizing signal output section 21B of the interface control section 31 in the printer 30 to the host computer 10 at step T1. Next, the printer 30 outputs a stop request signal, for example, BUSY signal, as a signal S5 to the host computer 10 or outputs stop request data, for example, XOFF code as a status signal S4 from the data transmission section 21C to the host computer 10 for requesting the host computer 10 to stop transmitting data to the printer 30 at step T2. After completion of necessary initialization processing and warm-up processing, the printer 30 outputs a stop release signal, for example, READY signal, as a signal S5 to the host computer 10 or outputs stop release data, for example, XON code as a status signal S4 from the data transmission section 21C to the host computer 10 at step T3. Next, the host computer 10 starts to transmit data S2 to the printer 30 at step T4.

After this, the host computer 10 transmits data S2 to the printer 30 as required and the printer 30 receives the data S2 at the data reception section 21A of the interface control section 31. The data reception section 21A transmits the data S2 to the print processing execution section 32, which then performs command detection and necessary print processing based on the received data. To output a change command for changing the clock rate of the synchronizing signal S3 from the host computer 10 to the printer 30, the change command is transmitted with data S2 to the printer 30 at step T5.

The change command is passed through the data reception section 21A of the interface control section 31 and is detected by the command detection section 227 of the print processing execution section 32. The command detection section 227 notifies the control section 21D of detection of the change command. Upon reception of the notification, the control section 21D outputs a stop request signal for requesting the host computer to stop transmitting data as a signal S5 to the host computer 10 or outputs stop request data as a status signal S4 from the data transmission section 21C to the host computer 10 at step T6. Further, the control section 21D instructs the synchronizing signal output section 21B to change the synchronizing signal S3 into the clock rate specified by the change command.

When the synchronizing signal output section 21B completes changing the clock rate of the synchronizing signal S3, it transmits the synchronizing signal S3 at the new setup clock rate to the host computer 10 at step T7. The synchronizing signal output section 21B notifies the control section 21D that the clock rate change is complete. In this case, the control section 21D transmits a stop release signal as a signal S5 to the host computer 10 or outputs stop release data as a status signal S4 from the data transmission section 21C to the host computer 10 at step T8.

After this, the host computer 10 transmits data S2 based on the synchronizing signal S3 at the new setup clock rate and the data transmission section 21C of the printer 30 transmits a status signal S4 based on the synchronizing signal S3 at the new setup clock rate.

In the second embodiment, the operation of the sections of the printer 30 is controlled by the CPU for performing required processing in accordance with the computer program, etc., stored in the ROM, etc., installed in the printer 30. However, as indicated by the dashed line in FIG. 6, a program for controlling the printer 30 may be stored on a recording medium 12 and the host computer 10 may read and execute the program stored on the recording medium 12.

As indicated by the dash line in FIG. 4, for instance, the host computer 10 may have a data transmission speed control section 16 for controlling so that print data prepared at a predetermined data preparation speed by application software 14 can be transmitted in synchronization with the clock rate of the synchronizing signal S3.

Processing similar to that performed by the data transmission speed control section 16 may be stored on a recording medium 12' as a program and the host computer 10 may read and execute the program.

Next, a third embodiment of the present invention will be discussed with reference to FIG. 7. Parts identical with those previously described with reference to the accompanying drawings are denoted by the same reference numerals. A printer 30 according to the third embodiment of the present invention is made up of an interface control section 33 connected to a host computer 10 and a print processing execution section 34 connected to the interface control section 33.

Figure 7:
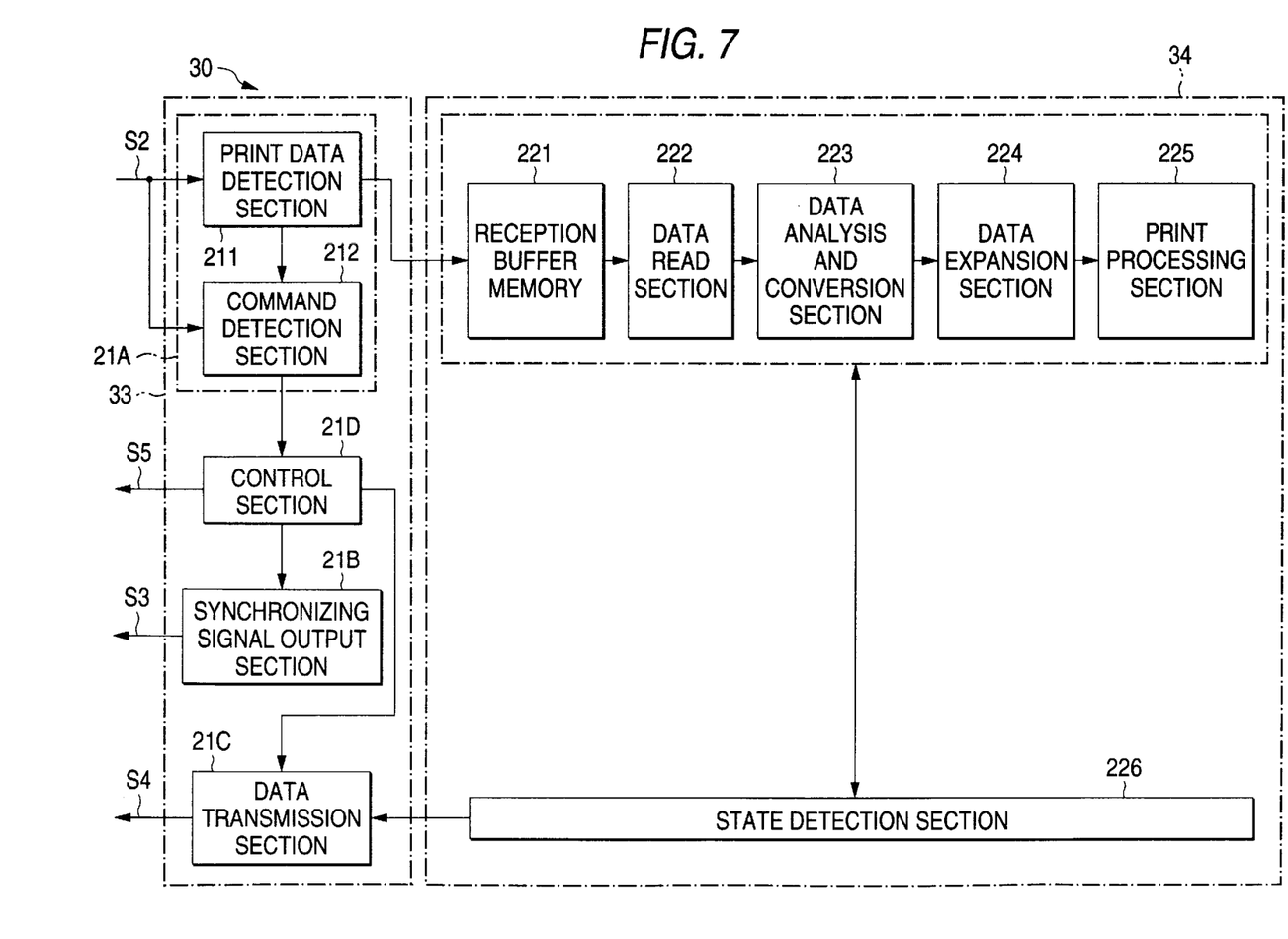
FIG. 7 is a block diagram to show the internal configuration of a printer according to a third embodiment of the present invention.

As shown in FIG. 7, the interface control section 33 comprises a data reception section 21A, a synchronizing signal output section 21B, a data transmission section 21C, and a control section 21D. The data reception section 21A is made up of a print data detection section 211 and a command detection section 212. The print processing execution section 34 has a reception buffer memory section 221, a data read section 222, a data analysis and conversion section 223, a data expansion section 224, a print processing section 225, and a state detection section 226.

In the interface control section 33, the print data detection section 211 detects print data in data S2 transmitted from the host computer 10 and transmits the detected print data to the print processing execution section 34. When detecting a clock rate change command in the data S2, the command detection section 212 notifies the control section 21D of detection of the change command. Upon reception of the notification indicating of detection of the change command from the command detection section 212, the control section 21D instructs the synchronizing signal output section 21B to change the clock rate of a synchronizing signal into the clock rate corresponding to the change command. The print processing execution section 34 is the same as that shown in FIG. 2 and therefore will not be discussed again.

As in the first and second embodiments, the operation of the sections of the printer 30 is controlled by a central processing unit (CPU) for performing required processing in accordance with instructions (a computer program and necessary data) stored in instruction storage means such as a ROM installed in the printer 30.

The printer 30 according to the third embodiment of the present invention operates in the same manner as the printer 30 according to the second embodiment (see FIG. 4) except that the command detection section 212 of the interface control section 33 detects a clock rate change command from the host computer 10, that the command detection section 212 notifies the control section 21D of detection of the change command, and that the print data detection section 211 detects the print data contained in the data signal S2 and transmits the detected print data to the print processing execution section 34.

As seen from the description made so far, the data transmission speed can be changed easily according to the printers 30 of the second and third embodiments of the present invention.

Figure 8:
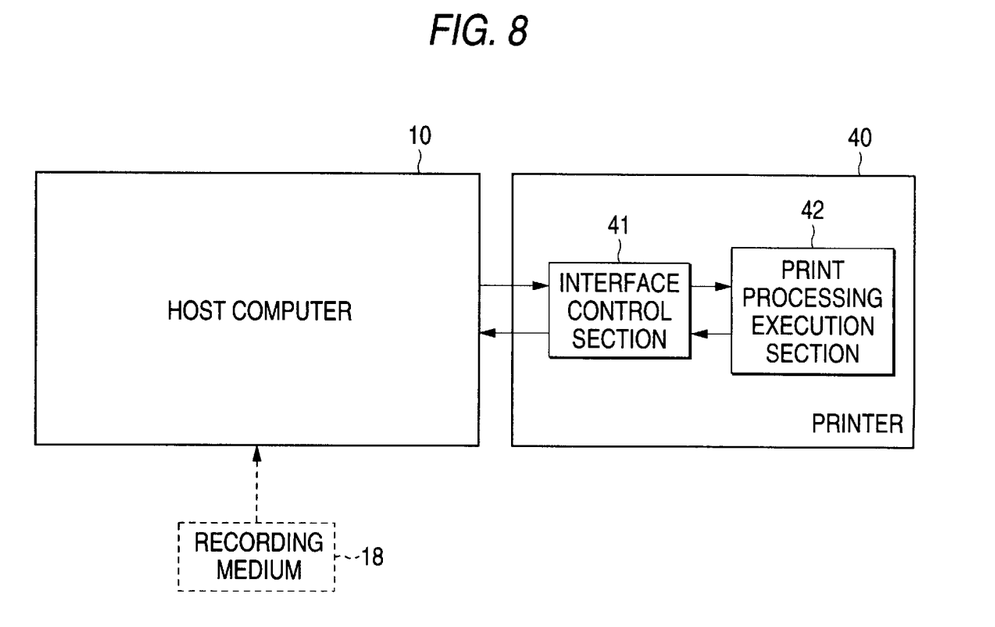
FIG. 8 is a block diagram to show a printer according to a fourth embodiment of the present invention.

Next, a fourth embodiment of the present invention will be discussed with reference to FIGS. 8 and 9. Parts identical with those previously described with reference to the accompanying drawings are denoted by the same reference numerals. As shown in FIG. 8, a printer 40 according to the third embodiment of the present invention is made up of an interface control section 41 connected to a host computer 10 and a print processing execution section 42 connected to the interface control section 41.

Figure 9:
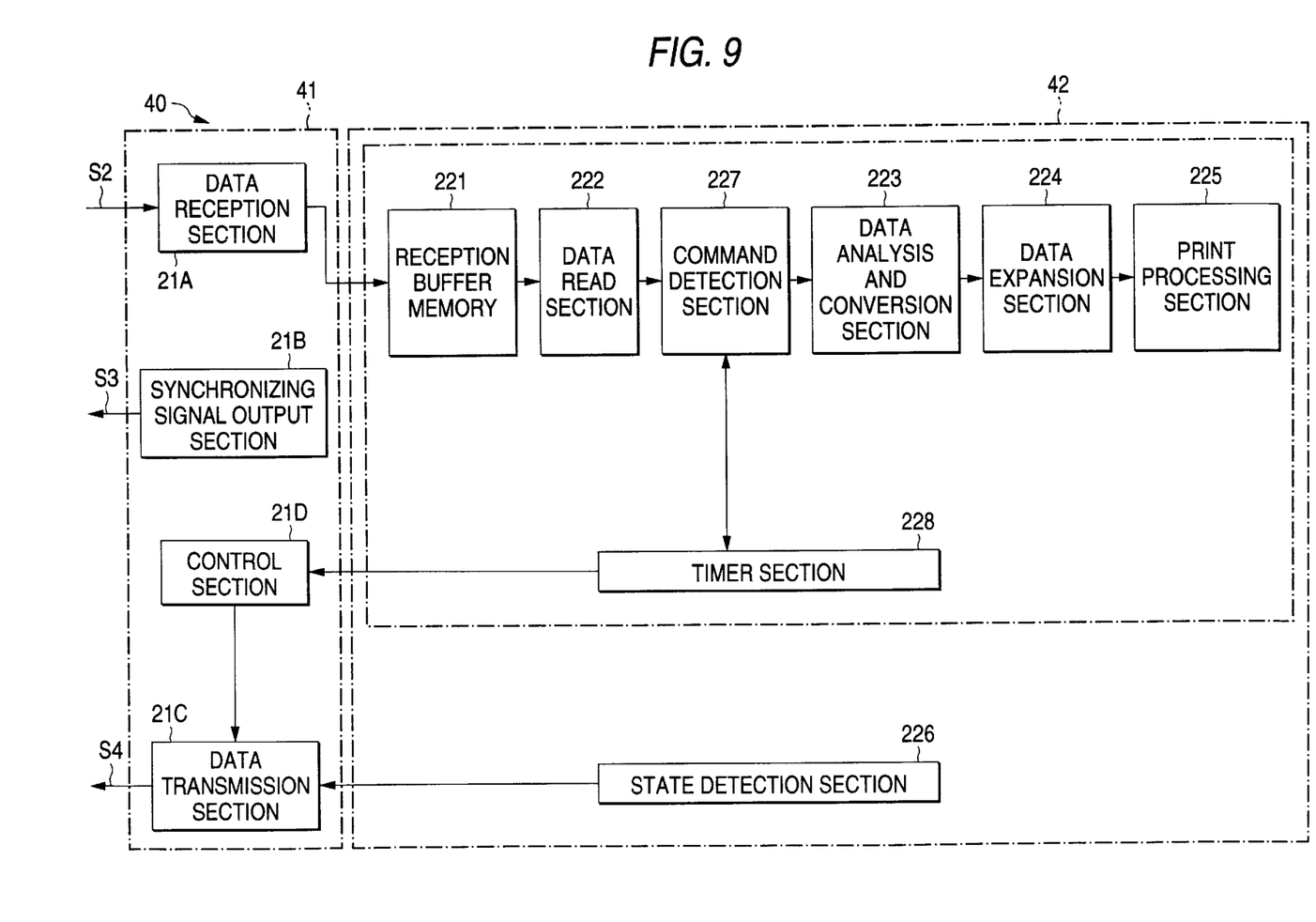
FIG. 9 is a block diagram to show the internal configuration of the printer in FIG. 8.

As shown in FIG. 9, the interface control section 41 comprises a data reception section 21A, a synchronizing signal output section 21B, a data transmission section 21C, and a control section 21D.

The data reception section 21A receives data S2 transmitted from the host computer 10 and outputs the data S2 to the print processing execution section 42. The synchronizing signal output section 21B outputs a synchronizing signal S3 to the host computer 10 and the host computer 10 outputs data to the printer 40 in synchronization with the synchronizing signal S3. The control section 21D detects the expiration of the count value in a timer section 228 of the print processing execution section 42 and upon detection of the expiration, gives a data output command signal to the data transmission section 21C. The data transmission section 21C temporarily stores data transmitted from the printer 40 to the host computer 10, such as a status signal transmitted from a state detection section 226. When receiving the data output command signal from the control section 21D, the data transmission section 21C outputs the data as long as a predetermined length in the stored data to the host computer 10 as a signal S4. That is, it outputs the data as long as the predetermined length in the data stored at a predetermined time interval determined by the count value in the timer section 228 to the host computer 10 as the signal S4.

The print processing execution section 42 has a reception buffer memory section 221, a data read section 222, a command detection section 227, a data analysis and conversion section 223, a data expansion section 224, a print processing section 225, the timer section 228, and the state detection section 226.

The reception buffer memory section 221 temporarily stores the data S2 input via the data reception section 21A of the interface control section 41. The data read section 222 reads the data stored in the reception buffer memory section 221 in sequence. When the command detection section 227 detects the change command in the data S2, it changes the setup count value in the timer section 228. The data analysis and conversion section 223 analyzes read data and converts the data into a predetermined data format. The data expansion section 224 expands the data provided by the data analysis and conversion section 223 into print image data. The print processing section 225 performs print processing based on the print image data provided by the data expansion section 224.

The timer section 228 has a predetermined count value set and counts in sequence in synchronization with a synchronization signal. The state detection section 226 outputs a status signal indicating the current state of the printer 40, such as printing, print completion, or no paper, in synchronization with the synchronizing signal S3 at a predetermined timing. The status signal output from the state detection section 226 is input to the data transmission section 21C and is temporarily stored therein. In addition to the status signal, for example, a code signal for indicating the model of the printer 40 is stored in the data transmission section 21C. Each of the signals stored in the data transmission section 21C is output from the data transmission section 21C to the host computer 10 as the signal S4 at a predetermined timing.

Next, the operation of the printer 40 will be discussed. First, with the printer 40 and the host computer 10 connected by a printer cable, the synchronizing signal S3 is output from the interface control section 41 of the printer 40 to the host computer 10. As the host computer 10 receives the synchronizing signal S3, it outputs data S2 synchronized with the synchronizing signal S3 from a transmission circuit (not shown) via the printer cable to the printer 40. In the normal state, print data in the data S2 transmitted from the host computer 10 is transmitted via the data reception section 21A to the print processing execution section 42, which then performs print processing for the print data.

On the other hand, when the printer 40 outputs a signal such as the status signal or code signal to the host computer 10 before print processing, during print processing, or upon completion of print processing, the signal is temporarily stored in the data transmission section 21C.

Upon the expiration of the count value in the timer section 228, the control section 21D sends a data output command signal to the data transmission section 21C. When receiving the data output command signal, the data transmission section 21C outputs the part of the temporarily stored data as long as a predetermined length, for example, one byte, to the host computer 10 as signal S4. Whenever the data transmission section 21C receives the data output command signal from the control section 21D, it outputs the signal S4. If no data is stored in the data transmission section 21C at the reception of the data output command signal, the data transmission section 21C does not output the signal S4.

On the other hand, in a system wherein the model of host computer 10 is changed or the host computer 10 is connected to another computer and peripheral machines by a LAN (local area network), when the host computer 10 outputs print data to the printer 40, it needs to change the data transmission speed from the printer 40 because the host computer 10 needs to perform any other processing at the same time. In such a case, the data S2 from the host computer 10 contains a change command for changing the data transmission speed. The change command is input via the data reception section 21A to the print processing execution section 42 and is detected by the command detection section 227 of the print processing execution section 42.

The command detection section 227 changes the count value set in the timer section 228 appropriately based on the change command, thereby changing the output timing of the signal S2 from the data transmission section 21C.

As in the first to third embodiments, the operation of the sections of the printer 40 is controlled by a central processing unit (CPU) for performing required processing in accordance with instructions (a computer program and necessary data) stored in instruction storage means such as a ROM installed in the printer 40.

As indicated by the dashed line in FIG. 8, a program for controlling the printer 40 may be stored on a recording medium 18 and the host computer 10 may read and execute the program stored on the recording medium 18.

Figure 10:
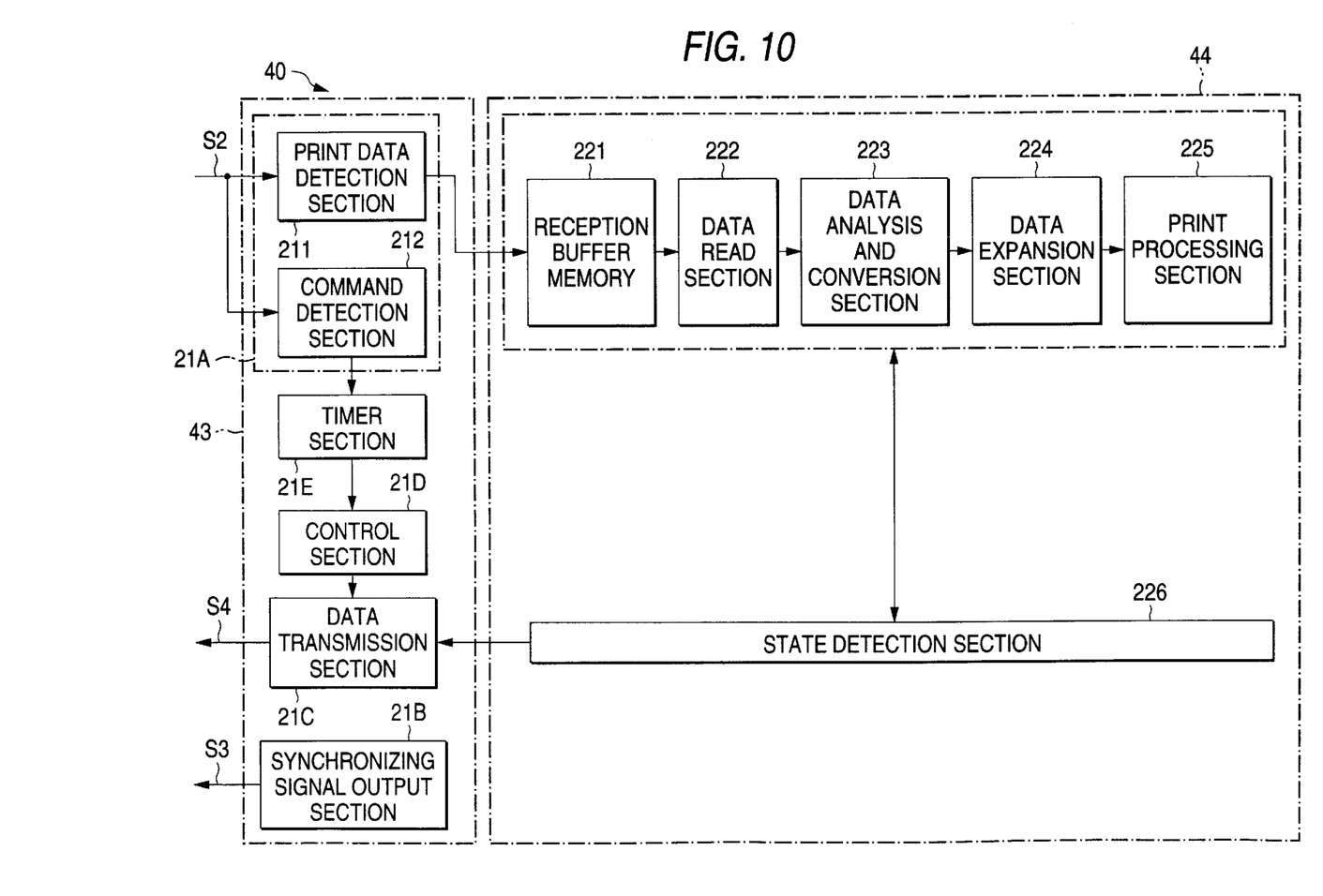
FIG. 10 is a block diagram to show the internal configuration of a printer according to a fifth embodiment of the present invention.

Next, a fifth embodiment of the present invention will be discussed with reference to FIG. 10. Parts identical with those previously described with reference to the accompanying drawings are denoted by the same reference numerals. As shown in FIG. 10, a printer 40 according to the fifth embodiment of the present invention is made up of an interface control section 43 connected to a host computer 10 and a print processing execution section 44 connected to the interface control section 43.

The interface control section 43 comprises a data reception section 21A, a synchronizing signal output section 21B, a data transmission section 21C, a control section 21D, and a timer section 21E. The data reception section 21A is made up of a print data detection section 211 and a command detection section 212.

The print processing execution section 44 has a reception buffer memory section 221, a data read section 222, a data analysis and conversion section 223, a data expansion section 224, a print processing section 225, and a state detection section 226.

The print data detection section 211 detects print data in data S2 transmitted from the host computer 10 and transmits the detected print data to the print processing execution section 44. The command detection section 212, which has the same function as the command detection section 223 in FIG. 9, detects a change command in the data S2 and changes the count value set in the timer section 21E in response to the change command. The timer section 21E, which has the same function as the timer section 228 in FIG. 9, has a predetermined count value set and counts in sequence in synchronization with a synchronization signal. The control section 21D detects the expiration of the count value in the timer section 21E and upon detection of the expiration, outputs a data output command signal to the data transmission section 21C.

In the printer 40 according to the fifth embodiment of the present invention, the command detection section 212 of the data reception section 21A detects the change command from the host computer 10. It changes the count value set in the timer section 21E appropriately based on the change command for changing the output timing of the signal S4 from the data transmission section 21C.

As seen from the description made so far, the printers 40 according to the fourth and fifth embodiments can transmit necessary data to the host computer reliably even if the host computer has a low data processing capability.

What is claimed is:

1. A printer for voluntarily transmitting a synchronizing signal to a host computer, for detecting print data from data synchronously transmitted from the host computer in response to the synchronizing signal by using a sampling signal, and for performing print processing based on the detected print data, wherein the frequency of the sampling signal is higher than that of the synchronizing signal.

2. The printer as claimed in claim 1 wherein the synchronizing signal is generated by dividing the sampling signal.

3. A printer comprising:
    an interface control section for communicating data between a host computer;
    a synchronizing signal output section for voluntarily outputting a synchronizing signal for causing the host computer to transmit print data synchronously with the synchronization signal; and
    a data detection section for detecting print data from data received from the host computer by using a sampling signal having a higher frequency than that of the synchronizing signal.

4. The printer as claimed in claim 3 wherein said synchronizing signal output section generates the synchronizing signal by dividing the sampling signal.

5. A printer comprising:
    an interface control section for communicating data between a host computer;
    a print processing execution section for performing print processing based on data received from the host computer via said interface control section;
    a synchronizing signal output section provided in said interface control section for voluntarily outputting a synchronizing signal to the host computer;
    a data reception section provided in said interface control section for receiving data transmitted from the host computer at data transmission speed based on the synchronizing signal;
    a command detection section for detecting a change command for changing a clock rate of the synchronizing signal in the data received at said data reception section; and
    a control section provided in said interface control section, when said command detection section detects the change command, said control section for giving a signal to the host computer for instructing the host computer to stop transmitting data and controlling said synchronizing signal output section so as to change the synchronizing signal to a clock rate specified in the change command, upon completion of changing the clock rate of the synchronizing signal, said control section for outputting a signal to the host computer for instructing the host computer to restart transmitting data.

6. The printer as claimed in claim 5 wherein said command detection section is provided in said interface control section.

7. The printer as claimed in claim 5 wherein said command detection section is provided in said print processing execution section.

8. An interface control method in a printer for communicating data between a host computer, said method comprising the steps of:
    outputting a synchronizing signal to the host computer;
    receiving data transmitted from the host computer at data transmission speed based on the synchronizing signal;
    detecting a change command for changing a clock rate of the synchronizing signal from the host computer in the received data;
    instructing the host computer to stop transmitting data when the change command is detected;
    changing the synchronizing signal into a clock rate specified in the change command; and
    instructing the host computer to restart transmitting data upon completion of changing the clock rate of the synchronizing signal.

9. A recording medium for storing a printer control program for executing the steps of:
- outputting a synchronizing signal to the host computer;
- receiving data transmitted from the host computer at data transmission speed based on the synchronizing signal;
- detecting a change command for changing a clock rate of the synchronizing signal from the host computer in the received data;
- instructing the host computer to stop transmitting data when the change command is detected;
- changing the synchronizing signal to a clock rate specified in the change command; and
- instructing the host computer to restart transmitting data upon completion of changing the clock rate of the synchronizing signal.

10. A printer comprising:
- an interface control section for communicating data between a host computer;
- a synchronizing signal generating section for generating a synchronizing signal to be voluntarily output to the host computer;
- a print processing execution section for performing print processing based on data received from the host computer via said interface control section;
- a timer section for counting a predetermined number of pulses included in the synchronizing signal;
- a control section for outputting a data output command signal each time expiration of the counting in said count section is reached; and
- a data transmission section for transmitting data of a predetermined length to the host computer upon reception of the data output command signal from said control section.

11. The printer as claimed in claim 10 wherein said timer section is provided in said interface control section.

12. The printer as claimed in claim 10 wherein said timer section is provided in said print processing execution section.

13. The printer as claimed in claim 11 said interface control section further includes a command detection section for detecting a change command for changing the count value in the data received from the host computer, said command detection section for changing the count value in said timer section when detecting the change command.

14. The printer as claimed in claim 12 said print processing execution section further includes a command detection section for detecting a change command for changing the count value in the data received from the host computer, said command detection section for changing the count value in said timer section when detecting the change command.

15. A recording medium for storing a printer control program for executing the steps of:
- generating a synchronizing signal to be voluntarily output to a host computer;
- counting a predetermined number of pulses included in the synchronizing signal;
- outputting a data output command each time expiration of the counting in said count section is reached; and
- transmitting data of a predetermined length to the host computer upon reception of the data output command.

16. A print system comprising:
- a host computer further including data transmission means for transmitting data to said printer in synchronization with the synchronizing signal at the predetermined clock rate and means for instructing said printer to change the synchronizing signal at the predetermined clock rate to a synchronizing signal at a different predetermined clock rate; and
- a printer connected to said host computer and further including synchronizing signal transmission means for transmitting a synchronizing signal at a predetermined clock rate to said host computer and means for changing the synchronizing signal at the predetermined clock rate to a synchronizing signal at the different predetermined clock rate specified by said host computer.

17. The print system as claimed in claim 16 wherein said printer further includes:
- stop request means for requesting said host computer to stop transmitting the data before the clock rate of the synchronizing signal is changed; and
- stop release means for releasing said host computer from stopping the data transmission after the clock rate of the synchronizing signal is changed.

18. A data transfer control method for controlling data transfer between a host computer and a printer in a print system comprising the steps of
- transmitting a synchronizing signal at a first clock rate from said printer to said host computer;
- starting to transmit data in synchronization with the synchronizing signal at the first clock rate from said host computer to said printer;
- transmitting a change command for changing the synchronizing signal at the first clock rate to a synchronizing signal at a second clock rate from said host computer to said printer;
- transmitting a stop request signal for requesting said host computer to stop transmitting data from said printer to said host computer;
- changing the synchronizing signal at the first clock rate into the synchronizing signal at the second clock rate specified in the change command and transmitting the synchronizing signal at the second clock rate by said printer to said host computer; and
- transmitting a stop release signal for releasing said host computer from stopping the data transmission from said printer to said host computer.

19. A recording medium for storing a program for controlling data transfer between a host computer and a printer in a print system, said data transfer control program for causing said host computer and said printer to execute the steps of:
- transmitting a synchronizing signal at a first clock rate from said printer to said host computer;
- starting to transmit data in synchronization with the synchronizing signal at the first clock rate from said host computer to said printer;
- transmitting a change command for changing the synchronizing signal at the first clock rate to a synchronizing signal at a second clock rate from said host computer to said printer;
- transmitting a stop request signal for requesting said host computer to stop transmitting data from said printer to said host computer;
- changing the synchronizing signal at the first clock rate into the synchronizing signal at the second clock rate specified in the change command and transmitting the synchronizing signal at the second clock rate by said printer to said host computer; and
- transmitting a stop release signal for releasing said host computer from stopping the data transmission from said printer to said host computer.

20. An information processing system being connected to a printer for
 transmitting print data in synchronization with a synchronizing signal at a predetermined clock rate voluntarily transmitted from the printer to a host computer, said information processing system comprising data transmission speed control section for controlling so that print data is synchronized with the clock rate of the synchronizing signal.

21. A recording medium for storing a program read and executed by a host computer being connected to a printer for transmitting print data to the printer, said program for executing the steps of:
 transmitting the print data in synchronization with a synchronizing signal at a first clock rate voluntarily transmitted from the printer to a host computer; and
 when the synchronizing signal received from the printer is changed to a synchronizing signal at a second clock rate, transmitting the print data in synchronization with the synchronizing signal at the second clock rate.

* * * * *